(12) United States Patent
Akabane et al.

(10) Patent No.: US 6,836,050 B2
(45) Date of Patent: Dec. 28, 2004

(54) TERMINAL STRUCTURES FOR MOTOR WITH BRUSH TO CONNECT MOTOR TO EXTERNAL CIRCUIT

(75) Inventors: Makoto Akabane, Nagano (JP); Masayuki Katagiri, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 14 days.

(21) Appl. No.: 10/287,467

(22) Filed: Nov. 4, 2002

(65) Prior Publication Data

US 2003/0168927 A1 Sep. 11, 2003

(30) Foreign Application Priority Data

Nov. 5, 2001 (JP) ........................................ 2001-338968

(51) Int. Cl.$^7$ .............................................. H02K 23/00
(52) U.S. Cl. ........................ 310/239; 310/242; 310/71; 310/244; 310/245; 310/246
(58) Field of Search ................................ 310/239–248, 310/71; H02K 23/00

(56) References Cited

U.S. PATENT DOCUMENTS 4,041,339 A * 8/1977 Huber et al. ................. 310/239
4,494,029 A * 1/1985 Hoshino et al. ............. 310/239
5,235,230 A * 8/1993 Yuhi et al. ..................... 310/71
5,287,028 A * 2/1994 Suzuki et al. .................. 310/71

FOREIGN PATENT DOCUMENTS

| JP | 05153751 A | * | 6/1993 | ............ H02K/5/14 |
| JP | 08205456 A | * | 8/1996 | .......... H02K/23/00 |
| JP | 11299165 A | * | 10/1999 | .......... H02K/13/00 |
| JP | 2000-050561 | | 2/2000 | .......... H02K/23/00 |
| JP | 2000184662 A | * | 6/2000 | .......... H02K/23/00 |

* cited by examiner

Primary Examiner—Karl Tamai
Assistant Examiner—Yahveh Comas
(74) Attorney, Agent, or Firm—Hogan & Hartson, LLP (57) ABSTRACT

A motor with brush includes a rotor having a rotary shaft and a commutator retained at the rotary shaft, two brush sections each having a plane surface in an axial direction of the rotor and in sliding contact with the commutator, and two brush terminals that are integral with the brush sections, respectively. Each of the brush terminals includes a brush connecting section formed in the axial direction of the rotary shaft and having a plane surface that connects to the plane surface of each of the corresponding brush sections, and a bent section that is bent in a direction generally orthogonal to the axial direction of the rotary shaft. The bent section restricts and fixedly positions the brush terminal and the brush section, and the brush terminals connect to external connection members that are provided outside the motor and inside an outer circumference of the motor.

19 Claims, 8 Drawing Sheets

TERMINAL STRUCTURES FOR MOTOR WITH BRUSH TO CONNECT MOTOR TO EXTERNAL CIRCUIT

BACKGROUND OF THE INVENTION

1. Field of the Invention

The present invention relates to a motor with brush, more particularly to terminal structures for connecting brushes of the motor to an external circuit.

2. Description of Related Art

A typical motor with brush includes a stator, a rotor having a rotary shaft and a brush section that is in sliding contact with a commutator that is retained at the rotary shaft of the rotor. Driving coils of the motor are energized through the brush section and the commutator. As a result, energization on the driving coils is switched according to rotational positions of the rotor, such that electromagnetic attraction and repelling forces between the rotor and the stator are continuously generated in one direction to continuously rotate the rotor. The brush is retained on the side of the stator in a manner to have a predetermined relative positional relation with the commutator, and is equipped with a terminal that allows the brush to be connected to an external connection member for supplying an external electrical power to the motor. The brush section that includes the terminal may have a variety of designs.

Figure 9A:
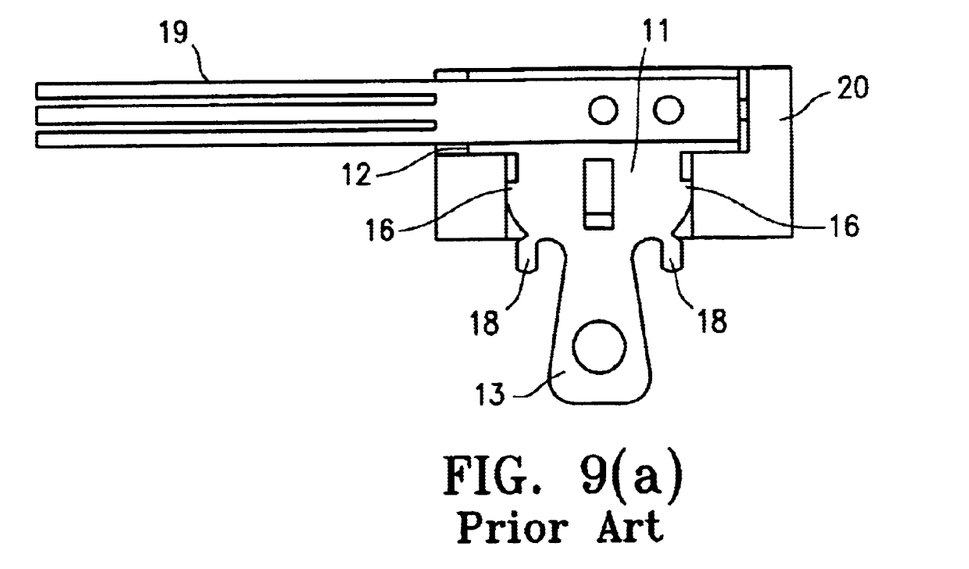
FIGS. 9(a) and 9(b) are side cross-sectional views of examples of a structure adjacent to brushes of a conventional motor with brush.
Figure 9B:
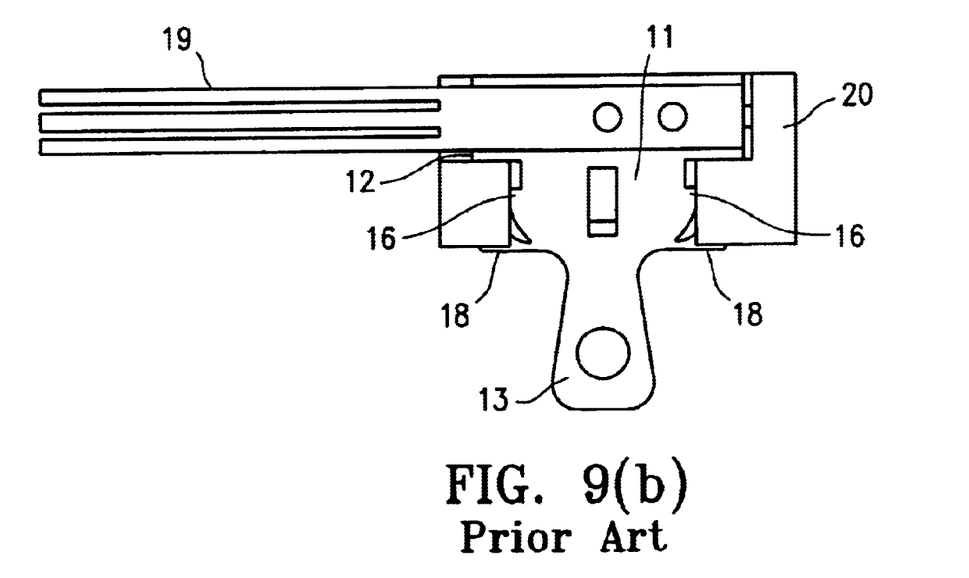

A conventional structure of a brush section of a motor with brush is shown in FIGS. 9(a) and 9(b). In FIG. 9(a), a terminal for a brush (hereafter referred to as a "brush terminal") 11 is bonded to a brush section 19 in a unitary fashion. The brush terminal 11 include a leg section 13 and bendable claw sections 18 on both sides of a base section of the leg section 13. The brush terminal 11 has a base section with retainer claw sections 16, which is press fitted in an insertion aperture of an insulation resin holder 20 such that the retainer claw sections cut into wall surfaces of the insertion aperture of the holder 20. Then, as shown in FIG. 9(b), the claw sections 18 are bent such that the holder 20 is held between the claw sections 18 and a stepped section 12 of the brush terminal 11, to thereby position and fix the brush terminal 11 to the brush section 19.

Figure 10A:
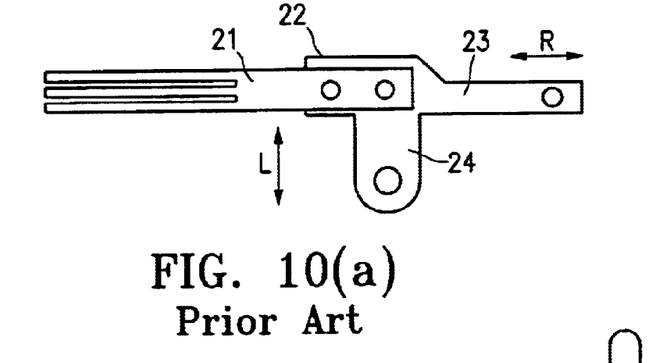
FIG. 10(a) is a side view of a brush area.
Figure 10B:
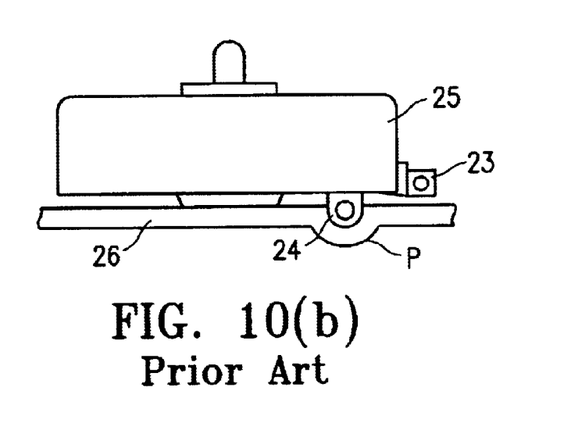
FIG. 10(b) is a side view of a motor in use in one example.

Another conventional structure of a brush section of a motor with brush is shown in FIGS. 10(a)–10(d). In FIG. 10(a), a brush terminal 22 is bonded to a brush section 21 in a unitary fashion. The brush terminal 22 includes a first power supply terminal section 23 that extends from the brush section 21 and a second power supply terminal section 24. The brush terminal 22 is affixed to an insulation member such as a resin holder in a manner that the first power supply terminal section 23 and the second power supply terminal section 24 protrude externally from a motor case 25, as shown in FIG. 10(b).

Figure 10C:
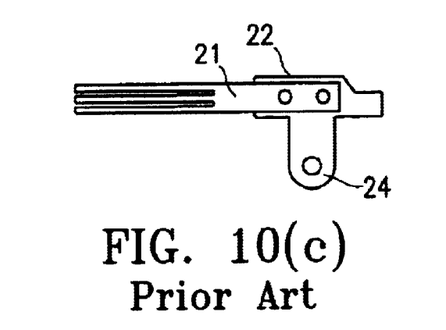
FIG. 10(c) is a side view of another example of a brush area.

In an example shown in FIG. 10(b), the motor is mounted on a substrate 26, and the second power supply terminal section 24 is fitted in a hole provided in the substrate 26 and soldered to a circuit pattern on the substrate 26. In this example, since the first power supply terminal section 23 is not required, the first power supply terminal section 23 can be removed, as shown in FIG. 10(c).

Figure 10D:
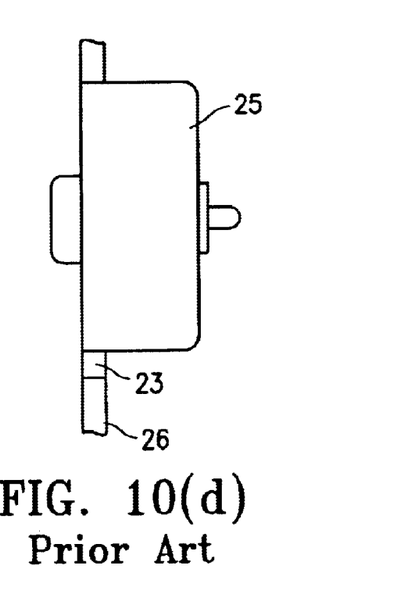
FIG. 10(d) is a side view of a motor in use in another example.

An example shown in FIG. 10(d) uses the first power supply terminal section 23. In this example, an outer circumference of the motor together with the first power supply terminal section 23 is fitted in a hole formed in the substrate 26, and the first power supply terminal section 23 is soldered to a circuit pattern on the substrate 26. In this case, the second power supply terminal section 24 is removed.

A lead wire for power supply is soldered to the brush terminal, or the brush terminal is soldered to a circuit pattern on the substrate. At the time of the soldering work, the resin holder may melt and deform, such that the position of the brush may be changed. If the position of the brush is changed, the timing to switch power to the driving coils may be deviated, which causes a fatal defect for the motor with brush. In view of this problem, the claw sections of the brush are bent to hold the resin holder by the claw sections and the stopped section of the brush terminal as indicated in FIG. 9. However, the structure shown in FIG. 9 as described above is not perfect as a countermeasure against the heat problem at the time of soldering work, and the shape of the terminal become complicated.

Figures 8A, 8B:
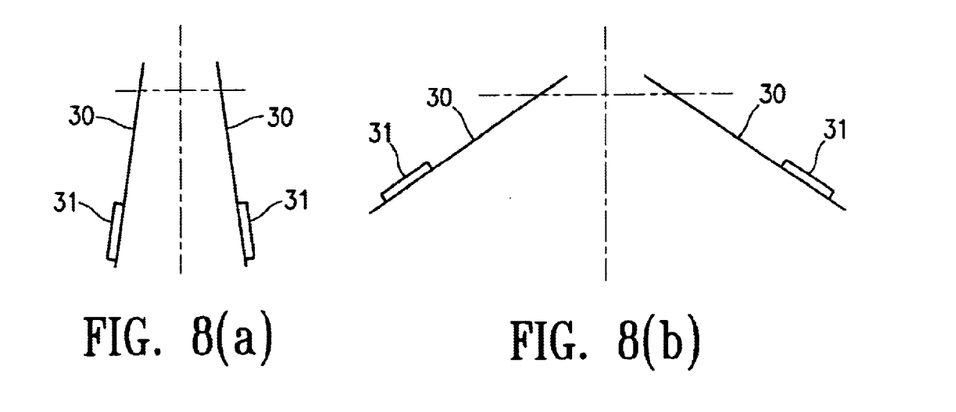
FIGS. 8(a) and 8(b) are schematic diagrams for describing examples of the relation between motor specifications and placements of brushes.

Also, in any of the conventional terminal structures described above, the disposed position of the brush determines the position of the terminal. If the locations of the brushes in a pair are separated from each other, the locations of the terminals in a pair are separated from each other accordingly. For example, in the case of a motor having four poles of magnets and six poles of cores, brushes in pairs are oriented in mutually orthogonal directions, and accordingly the positions of terminals in pairs are separated 90 degrees from one another around the rotational center of the motor. FIGS. 8(a) and 8(b) show a comparison between the above motor structure with four poles of magnets and six poles of cores and an ordinal motor structure with two poles of magnets and three poles of cores. FIG. 8(a) indicates the motor structure with two poles of magnets and three poles of cores, in which brush sections 30 in a pair are generally in parallel with each other, and terminals 31 in a pair are located relatively close to each other. FIG. 8(b) indicates the motor structure with four poles of magnets and six poles of cores. Since brush sections 30 in a pair extend in directions at generally 90 degrees to each other, terminals 31 in a pair are widely separated from each other. For this reason, external connection members such as lead wires are disposed separated from each other, which becomes to be an obstacle to automated and more efficient wiring works. Furthermore, the conventional examples indicated in FIGS. 9 and 10 have a disadvantage in that the shape of the terminals becomes complicated when the positions of the terminals in pairs are converged in order to automate and improve efficiency of wiring works.

SUMMARY OF THE INVENTION

The present invention has been made to solve the problems of the conventional technology, and therefore the present invention provides a motor with brush that can prevent the positions of brush terminals and brush sections from being changed by heat caused by soldering when external connection members such as terminals and lead wires are soldered to the brush terminals.

The present invention also provides a motor with brush that can increase the fixing strength of a brush terminal that is boned to a brush section in a unitary fashion.

The present invention further provides a motor with brush in which terminals of the motor to be connected to external connection members can be readily arranged in any optional positions without being restricted by mutual positions of two brush sections in a pair, and terminals to be connected to external connection members can be lead out to an external circumferential side or a rear surface side of the motor depending on the requirements.

In accordance with an embodiment or the present invention, a motor with brush is equipped with a brush section and a brush terminal that is connected to the brush section in a unitary fashion, wherein the brush terminal may include a brush connecting section having a plane that is connected to the brush section, and a bent section that is bent in a direction orthogonal to an axial direction of a rotary shaft of the motor. The bent section restricts the positions of the brush terminal and the brush section.

By forming the bent section at the brush terminal in a manner described above, the bent section function as a stopper section to prevent the position of brush section from moving in the axial direction, and prevents the positions of the brush terminal and the brush section from moving by heat caused by soldering when external connection members are soldered to the brush terminal.

In the above embodiment, the external connection member may preferably be connected to the bent section of the brush terminal, which simplifies the structure of the brush terminal.

In the above embodiment, the external connection members define external connection terminals that protrude from an outer circumferential surface of the motor may preferably have plane sections formed inside the outer circumferential surface of the motor in a direction orthogonal to an axial direction of a rotary shaft. By forming the external connection terminals to have plane sections inside the outer circumferential surface of the motor in a direction orthogonal to an axial direction of a rotary shaft, the bent sections of the brush terminals can be readily, electrically connected to the plane sections of the external connection terminals.

Also, in the embodiment described above, the bent sections of the brush terminals may be disposed to overlap the external connection terminals. As a result, the external connection terminals are prevented from being raised when the brush terminals and the external connection terminals are soldered together, and also the fixing strength of the brush terminals can be increased as a result of connecting and fixing the brush terminals to the external connection terminals.

Also, in the embodiment described above, the external connection terminals may be formed from plate-like members that can be mounted on a motor in parallel with a side plate of the motor, wherein each of the external connection terminals may have an extended section that extends in a circumferential direction of the motor to be connected to the brush terminal and a terminal section that extends in a radial direction of the motor. As a result, connecting points of the motor to external connection members can be readily arranged in any optional positions by optionally designing the shape of the respective extended sections, without being restricted by mutual positions of the two brush sections in a pair. Further, the connecting points to external connection members can be formed anywhere on the motor, e.g., on an outer circumferential side or a rear surface side of the motor depending on the requirements.

It is noted that the brush terminal may be press-fitted in an aperture of a brush holder to retain the brush terminal wherein the brush terminal pressed-fitted in the aperture functions to restrict the position of the brush terminal, in combination with the bent section that serves to restrict the position of the brush terminal in the rotary axis direction. As a result, movements of the positions of the brush terminals and brush sections can be more securely prevented.

Other features and advantage of the invention will be apparent from the following detailed description, taken in conjunction with the accompanying drawings that illustrate, by way of example, various features of embodiments of the invention.

BRIEF DESCRIPTION OF THE DRAWINGS

FIGS. 4(a) and 4(b) show a brush holder section, wherein

FIGS. 10(a)–10(d) show conventional structures of motors with brush, wherein

DESCRIPTION OF PREFERRED EMBODIMENTS

Motors with brush in accordance with various embodiments of the present invention will be described below with reference to the accompanying drawings.

Referring to FIGS. 1–5, a motor with brush includes a cylindrical motor case 60 with a bottom section. An end plate is inserted in an opening end section of the motor case 60. The end plate is formed from a side plate 49 of a metal substrate and a brush holder 50 of an insulation resin connected to the side plate 49. A brush unit 65 is attached to the brush holder 50. More particularly, the brush unit 65 is formed from a brush section 51 and a brush terminal 52, as shown in FIG. 6. The brush section 51 is in sliding contact with a commutator 70 that is retained at a rotary shaft of a rotor of the motor, and the brush terminal 52 is connected to the brush section 51 in a unitary fashion. The brush terminal 52 of the brush unit 65 is inserted and press-fitted in an aperture provided in the brush holder 50 in a thickness direction of the brush holder 50. An end plane section of the brush section 51 is overlapped with a plane surface of a base section of the brush terminal 52. The brush terminal 52 extends in a direction generally orthogonal to a length direction (along longer edges) of the brush section 51, and the overlapped sections of the brush terminal 52 and the brush section 51 are fixedly connected to each other by an appropriate means, such as, for example, rivets.

Figure 1:
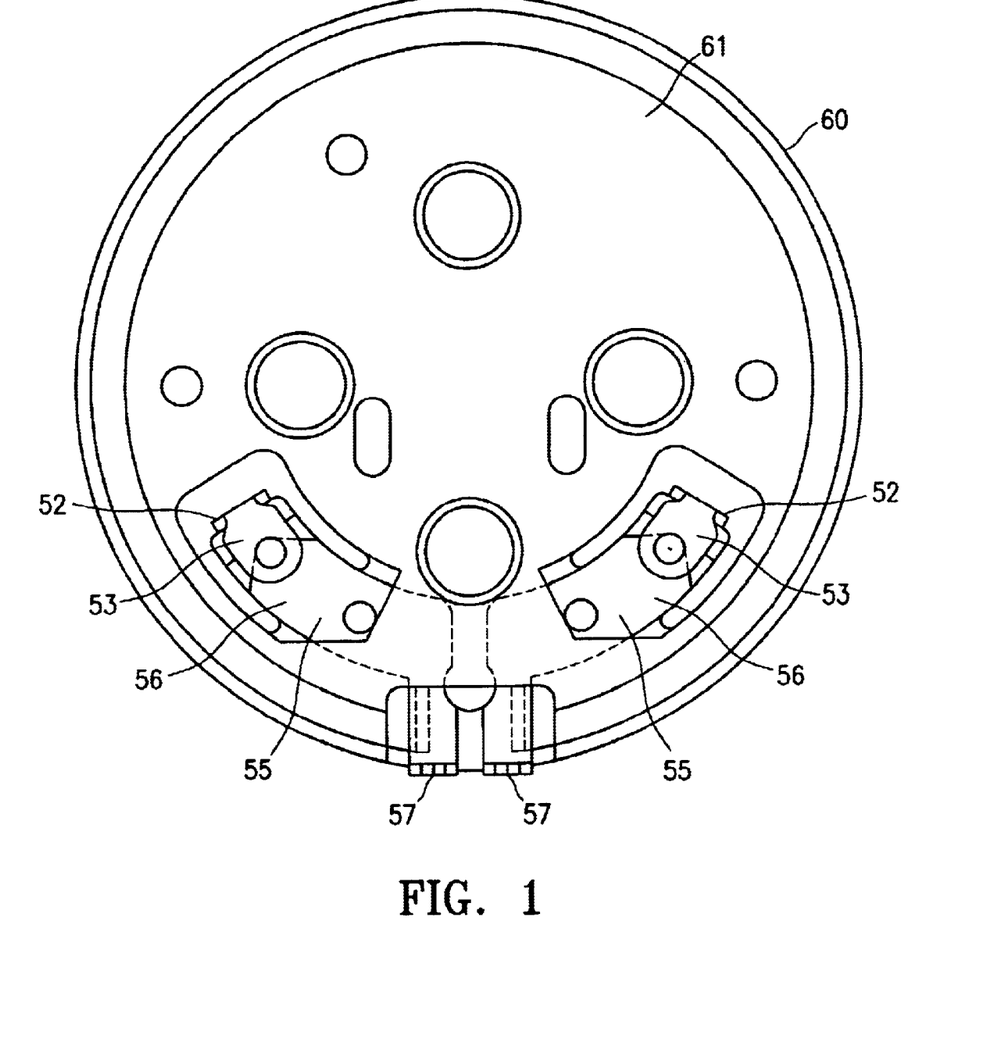
FIG. 1 shows a bottom view of a motor with brush in accordance with an embodiment of the present invention.
Figure 2:
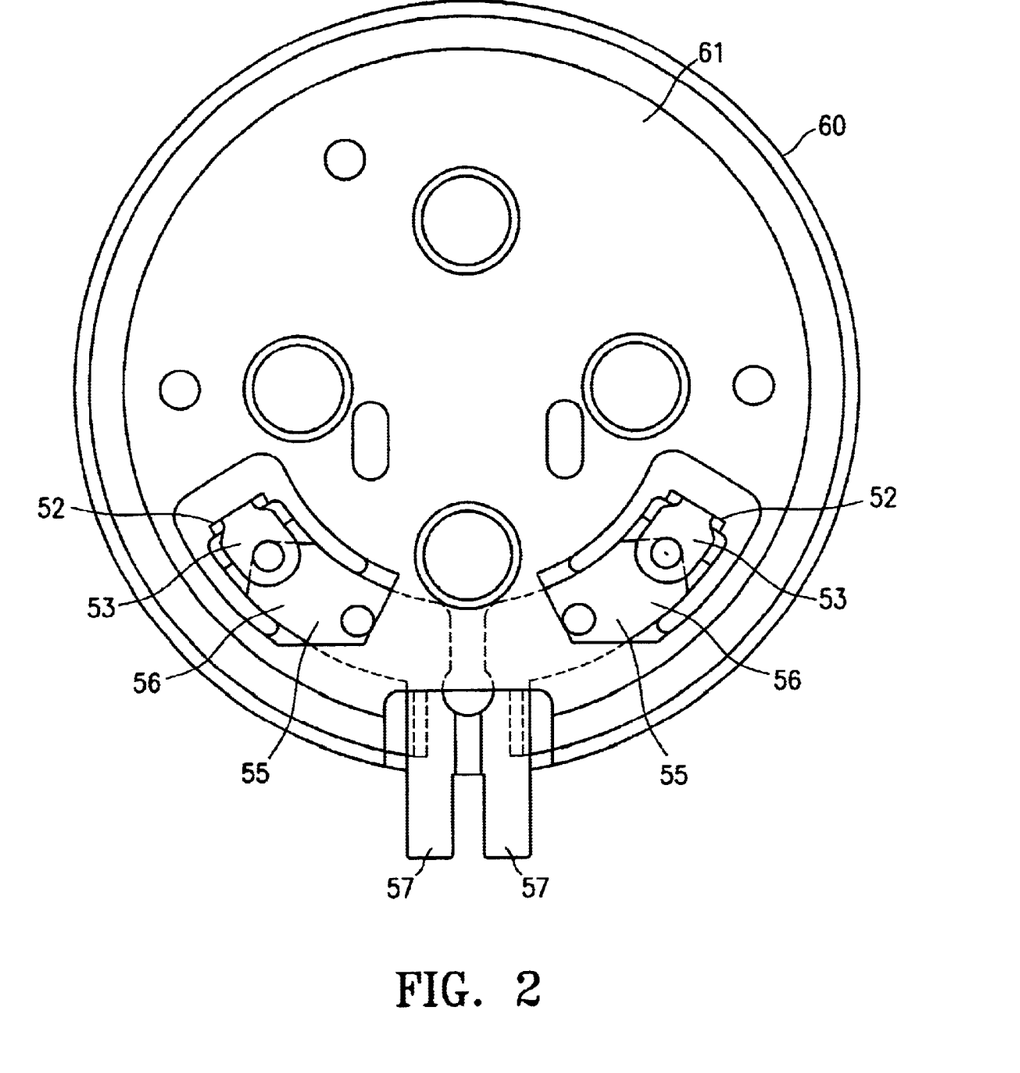
FIG. 2 shows a bottom view of the motor with brush of the embodiment in a different example.
Figure 3:
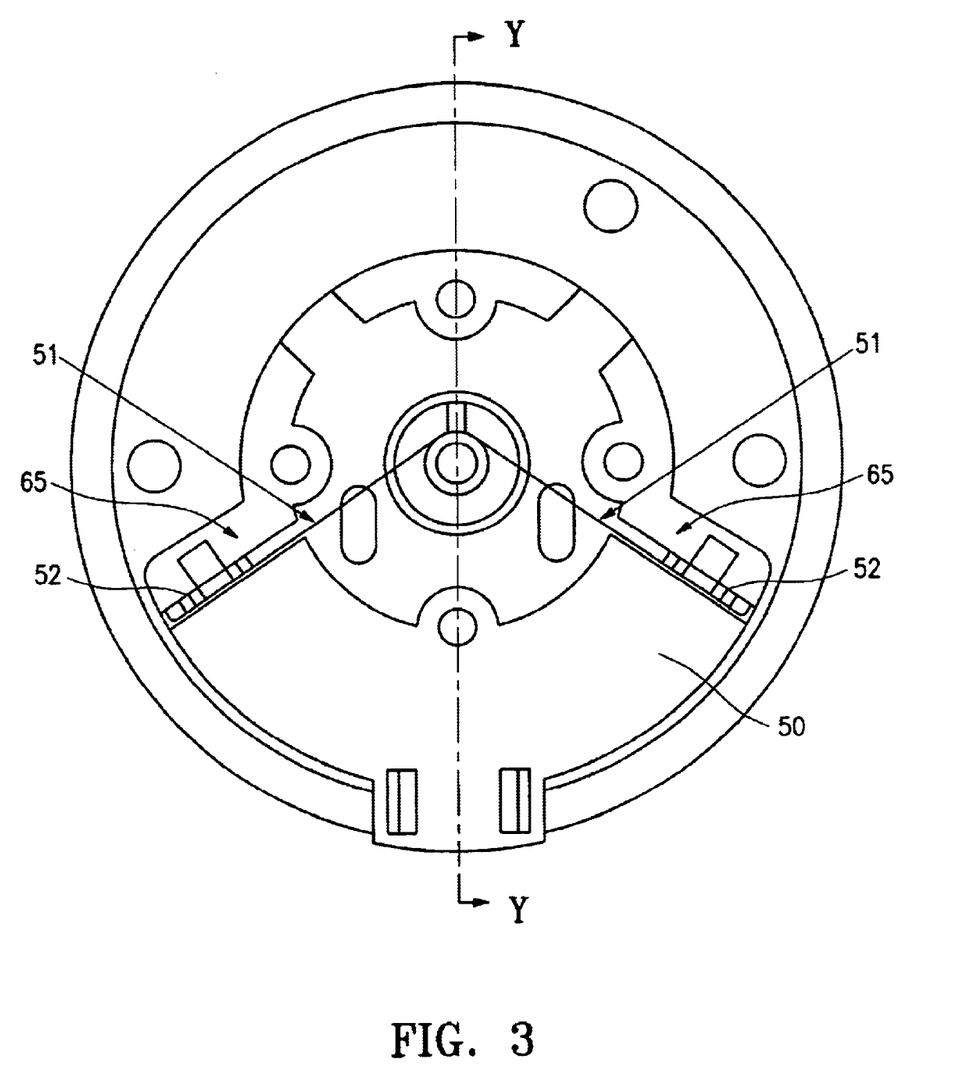
FIG. 3 shows a front view illustrating a brush holder and a brush section of the motor of the embodiment.

A FIGS. 1–3 show, the brush terminals 52 in a pair are positioned separated from each other. This is because the structure of the motor has, for example, four poles of magnets and six poles of cores, and the brush sections 51 in a pair extend in directions at 90 degrees, such that the base sections of the brush sections 51 that connect to the respective brush terminals 52 are located separated from one another. Accordingly, it may be difficult to connect the brush terminals 52 directly to, for example, an external circuit such as a circuit pattern formed on the circuit substrate. However, in the illustrated embodiment, to facilitate connection of the brush terminal 52 to an external circuit, external connection terminals 55, which serve as external connection members, are connected to the brush terminals 52, such that the connection sections of the brush terminals 52 to be connected to an external circuit are converged.

The external connection terminals 55 are plate-like members that may be attached to and in parallel with the brush holder, which is also serving as a side plate of the motor. Each of the external connection terminals 55 has an extended section 56 that extends in a circumferential direction of the motor and is connected to the brush terminal 52. The extended section 56 is formed in an arcuate shape defined about the rotary shaft of the motor as a center, and a terminal section 57 extends outwardly in a radial direction from one end of the arcuate section of the extended section 56. The extended section 56 and the terminal section 57 are formed in one piece in the present embodiment. An aperture may be formed in an intermediate section of the arcuate extended section 56, and the brush holder 50 may be provided with a protrusion. The protrusion of the brush holder 50 may be inserted in the aperture of the arcuate extended section 56 of the external connection terminal 55. The protruded section is used as a heat caulking section 58 to affix the external connection terminal 55 to the brush holder 50. The extended section 56 of the external connection terminal 55 has a plane section formed inside the outer circumferential surface of the motor in a direction orthogonal to the direction of the rotary shaft.

Figure 4A:
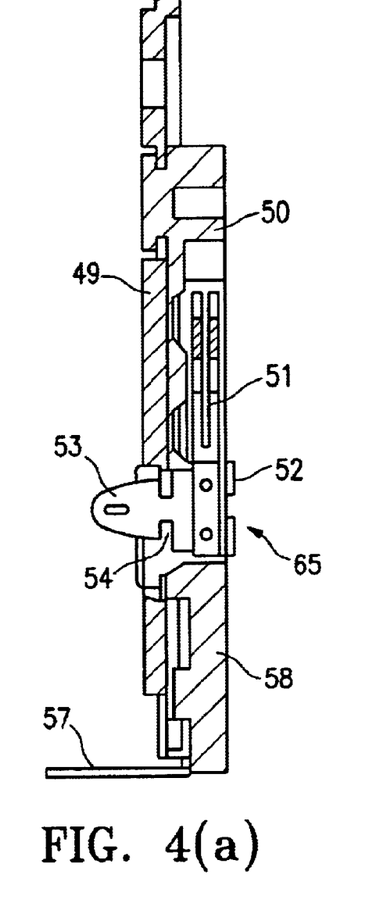
FIG. 4(a) is a cross-sectional view of the brush holder section taken along a line Y—Y of FIG. 8.
Figure 4B:
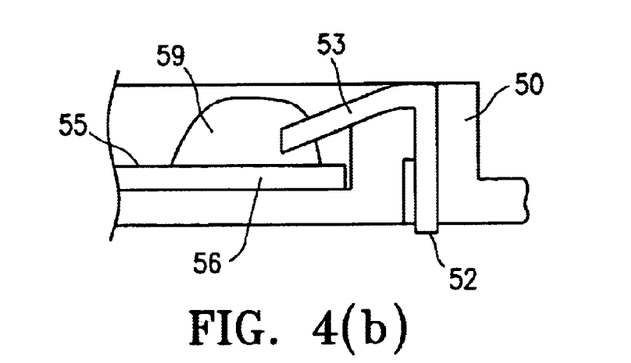
FIG. 4(b) is a cross-sectional view of a connection section that connects a brush terminal and an external connection terminal.

The brush terminal 52 is press fitted in a predetermined aperture formed in the brush holder 50 and passed through the brush holder 50, such that a part of the brush terminal 52 extends out on the opposite side of a surface of the brush holder 50 where the brush section 51 is provided. The part of the brush terminal 52 protrudes at a position adjacent to the extended section 56 of the external connection terminal 55. As shown in FIG. 4(*b*), a portion of the brush terminal 52 may be bent at a narrowed section 54 to define a bent section 53. The bent section 53 may be formed by bending the portion of the brush terminal 52 along a line in a direction orthogonal to the direction of the rotary shaft of the motor as indicated in FIGS. 4(*a*) and 4(*b*). When the bent section 53 is bent at an acute angle with respect to the main section of the brush terminal 52 that extends in the axial direction, the bent section 53 prevents the brush terminal 52 from moving in the axial direction, and also the bent section 53 overlaps on the extended section 56 of the external connection terminal 55 and presses down the extended section 56. As a result, the extended section 56 is held between the brush holder 50 and the bent section 56, and the external connection terminal 55 is prevented from being lifted up from the surface of the brush holder 50.

As shown in FIG. 4(*b*) the overlapped sections of the bent section 53 of the brush terminal 52 and the extended section 56 of the external connection terminal 55 are bonded and electrically connected by a solder 56. The brush terminal 52 and the external connection terminal 55 are connected at a location inside the external circumferential surface of the motor.

The terminal sections 57 of the two external connection terminals 55 in a pair pass through a cut section provided in the motor case 60, and extend out and in a radial direction of the motor case 60. The terminal sections 57 in a pair may be bent at right angle to extend generally in parallel with the external circumferential surface of the motor case 60 as in the example shown in FIG. 1. Or, as shown in FIG. 2, the terminal sections 57 in a pair may protrude out in the radial direction of the motor case 60 without being bent. The motor case 60 is covered with an insulation cover 61 from the outside surface side of the brush holder 50.

In the embodiment described above, the brush terminals 52 are connected to the external connection terminals 55 serving as external connection members. Accordingly, the external connection terminal 55 may be formed into any optional shape so that the terminal to be connected to an external circuit can be arranged to be located at any desired position. Accordingly, for example, in the case of a motor with four poles of magnets and six poles of cores in which a pair of brushes are disposed in directions mutually orthogonal to each other, the positions of the terminal sections 57 of the external connection terminals 55 in a pair can be converged and located adjacent to each other. As a result, wiring works can be facilitated, automated and more efficiently conducted. Consequently, the shape of the terminals does not become complicated, and motors with brush can be provided at low costs.

The tip sections of the extended sections 56 of the external connection terminals 55 are directly or indirectly pushed down by the bent sections 53 of the brush terminals 52 and may be soldered to the bent sections 53 of the brush terminals 52, such that the external connection terminals 55 are prevented from rising from the surface of the brush holder 50.

On the other hand, the brush terminals 52 retain and press down the brush holder 50 with their bent sections 53 such that the position of the brush terminals 52 is restricted in the rotational direction and in the rotary axis direction, and therefore the brush terminals 52 are accurately positioned. Also, when the external connection terminals 55 serving as external connection members are soldered to the brush terminals 52, the positions of the brush terminals 52 and the brush sections 51 are prevented from moving due to the heat generated by the soldering because the bent sections 53 restrict the position of the brush terminals 52. In addition, since the brush terminals 52 are press fitted in the brush holder 50, the brush terminals 52 can be even more accurately positioned, coupled with the positioning in the rotary axis direction by the bent sections 53. As the positioning accuracy for the brush terminals 52 is improved, the brush sections 51 that are formed with the brush terminals 52 in a unitary fashion can also be accurately positioned.

Figure 5A:
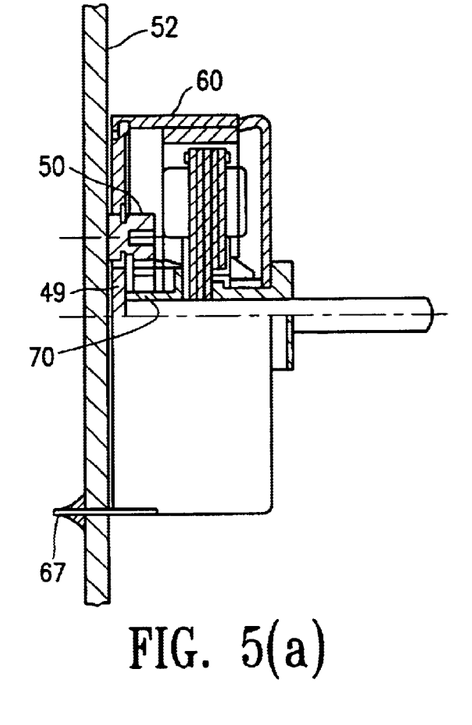
FIGS. 5(a) and 5(b) are cross-sectional side views in part of examples of the motor used in two different manners.
Figure 5B:
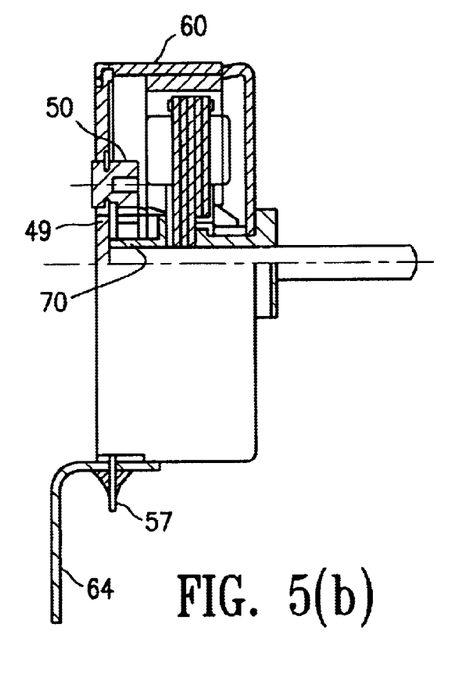
Figure 6:
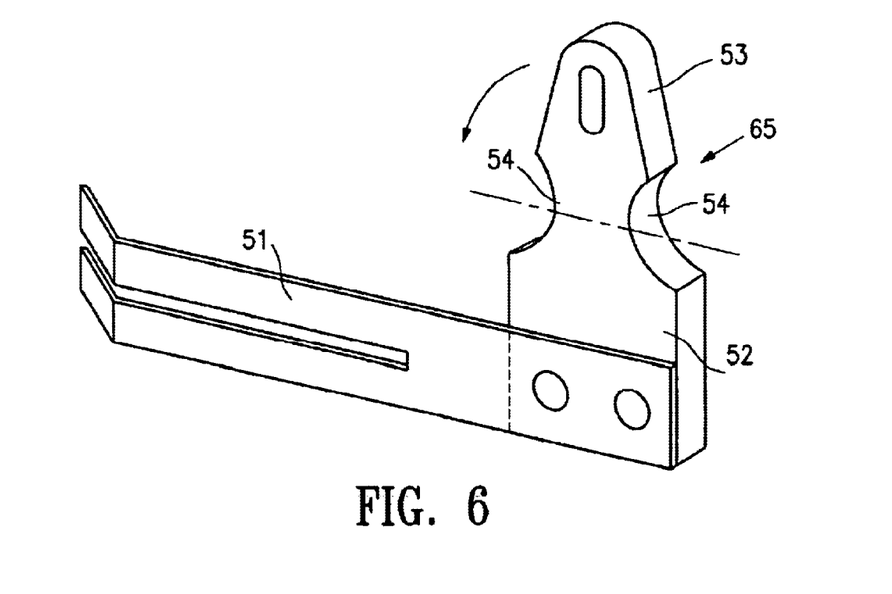
FIG. 6 shows a perspective view of a brush section and a brush terminal in accordance with the present embodiment.

Two examples of use of the motor with brush in accordance with the present embodiment are indicated in FIGS. 5(*a*) and 5(*b*). FIG. 5(*a*) shows a use state, similar to the example shown in FIG. 1, in which the terminal sections 57 of the external connection terminals 55 in a pair are bent generally at right angle such that the terminal sections 57 extend generally in parallel with the external circumferential surface of the motor case 60. In this example, the motor is mounted on a circuit substrate 62, in which the terminal sections 57 are inserted in an insertion aperture of the circuit substrate 62 to pass through the circuit substrate 62, and the terminal sections 57 that protrude on the opposite surface of the circuit substrate 62 are connected by soldering to a circuit pattern formed on the circuit substrate 62.

FIG. 5(*b*) shows a use state, similar to the example shown in FIG. 2, in which the terminal sections 57 in a pair are not bent, but extend out in a radial direction of the motor case 60. The terminal sections 57 are passed through an aperture formed in one end section of a flexible circuit substrate 64, and connected by soldering to a circuit pattern formed on the flexible circuit substrate 64.

As indicated in FIGS. 5(a) and 5(b), depending on how the motor is used, the terminal sections 57 of the external connection terminals in a pair may be protruded in a direction orthogonal to the rotary axis, or may be protruded in a direction parallel to the rotary axis. In other words, the terminal sections 57 of the external connection terminals can be flexibly arranged in any locations without substantial limitations.

The external connection terminals 55 in a pair are symmetrical along a center line when used, and therefore members having an identical shape can be used for the connection terminals 55 in a pair by turning over one of the members.

Figure 7A:
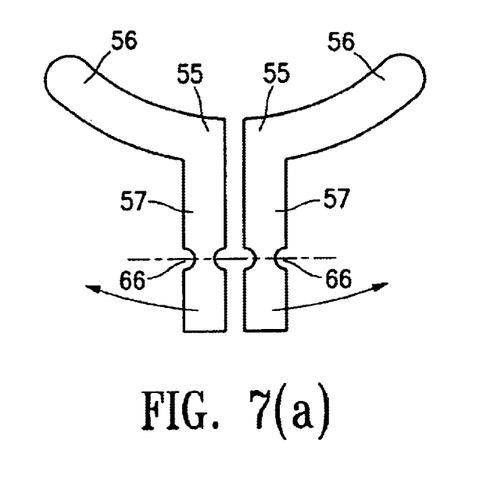
FIGS. 7(a) and 7(b) show front views of external connection terminals in accordance with other embodiments of the present invention.

Also, as indicated in FIG. 7(a), cut sections 66 may be formed in the terminal sections 57 to facilitate bending of the terminal sections 57 of the external connection terminals 55 in a pair. When the terminal sections 57 are to be protruded out in a radial direction of the motor, the terminal sections 57 may be extended out without being bent. Accordingly, the terminal sections 57 of the external connection terminals 55 can readily accommodate different specifications by different users after motors are manufactured.

Figure 7B:
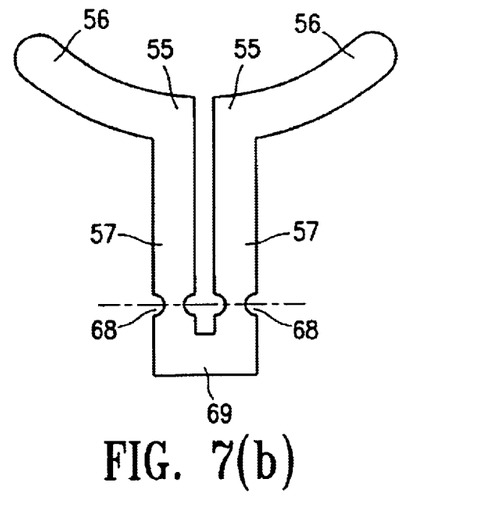

Also, as shown in an example of FIG. 7(b), external connection terminals 55 that are to form a pair may be formed in one-piece part which connects the external connection terminals 55 with a connection section 69. After the one-piece part is mounted on the motor, the connection section 69 can be removed to use the external connection terminals 55 in a pair as independent parts. In this example, the connection section 69 is provided at one end sections of the terminal sections 57, and cuts 68 are formed in the terminal sections 57 near the connection section 69. The connection section 69 may be removed by cutting the terminal sections 57 at the cuts 68. Alternatively, in addition to the cuts 68, other cuts may be provided to be used for bending the terminal sections 57. Because the external connection terminals 57 in a pair can be handled as a one-piece part, and the connection section 69 can be removed after the one-piece part is assembled on the motor, the number of assembly steps can be reduced.

In the present embodiment described above, the external connection terminals 55 serving as external connection members are connected to the brush terminals 52. However, an external connection lead wire can be connected to each of the brush terminals 52. The lead wire may be connected to the bent section 53 of the brush terminal 52 directly by soldering. In this case, the bent section 53 is directly pressed against the brush holder 50, and restricts of position of each of the brush terminals 52 in the rotary shaft direction. In this case, as shown in FIG. 6, an aperture may preferably be provided in the bent section 53 for passing the end section of the lead wire through the aperture. The brush holder 50 may be provided with grooves to store the lead wires. Each of the lead wires can be stored in each of the grooves formed in the brush holder 50, and converged together.

Brush terminals in a pair may be disposed separated from each other even when there are two poles of magnets and three poles of cores. For example, this happens when the brush sections in a pair are disposed about a commutator at positions separated at 180 degrees, in other words, the brush sections are point-symmetrical about the center of rotation. Even in this case, terminal sections to be connected to all external circuit can be converged by using brush terminals and external connection terminals, more specifically, by appropriately setting the length of extension sections of the external connection terminals. In this case, for example, the two extension sections may be provided with the same length and the terminal sections may be converged, i.e., disposed adjacent to each other; or one of the two extension sections my be made longer than the other, and the two terminals sections may be disposed adjacent to each other.

Conversely, there may be cases when terminal sections to be connected to an external circuit need to be separated from each other for the convenience of connecting to the external circuit even when brush terminals in a pair are located close to each other. In such a case, the positions of the terminal sections 57 with respect to the extended sections 56 of the external connection terminals 55 in a pair shown in FIGS. 1 and 2 may be changed. Although, in the examples shown in FIGS. 1 and 2, the terminal sections 57 extend from mutually adjacent ends of the extended sections 56, the extended sections 56 may be extended outwardly in a radial direction from mutually far ends of the extended sections in a pair.

It is noted that the external connection terminals may be affixed to the brush holder 50 by insert-forming the external connection terminals in advance together with the brush holder 50. By so doing, the number of steps for assembling a motor can be reduced.

As described above, in accordance with the present invention, when external connection members are soldered to brush terminals, the positions of the brush terminals and brush sections are prevented from being moved by heat from the soldering work.

Also, in accordance with the present invention, brush terminals of a motor to be connected to external connection members can be readily arranged in any optional positions without being restricted by mutual positions of brush sections in a pair, and brush terminals to be connected to external connection members can be lead out to an outer circumferential side or a rear surface side of the motor depending on the requirements.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor with brush comprising:

two brush sections; and two brush terminals, each of which is integral with the brush section, the brush terminal including:

a brush connecting section having a plane surface to which the brush section is connected; and a bent section that is bent in a direction generally orthogonal to an axial direction of a rotary shaft of the motor and is disposed inside an outer circumference of the motor, wherein the bent section restricts a position of the brush section, and two external connection members each of which is connected to the brush terminal inside the outer circumference of the motor, each of the two external connection members includes an extended section extending in a circumferential direction of the motor and a terminal section, wherein the brush terminals are respectively connected through the bent section to an end portion of the extended section of the external connection members at positions which extend in a circumferential direction of the motor, and respective second end portions of the extended sections are disposed to approximately converge.

2. A motor with brush according to claim 1, further comprising a brush holder mounted on a motor case, wherein the brush terminal is mounted on the brush holder.

3. A motor with brush according to claim 2, wherein the brush holder defines an insertion aperture and a part of the brush terminal is press fitted in the insertion aperture of the holder to fixedly retain the brush terminal to the brush holder.

4. A motor with brush according to claim 2, wherein the brush terminal has a base section connected to the brush section, and wherein, when the brush terminal is passed through the insertion aperture of the brush holder, the base section of the brush terminal connecting to the brush section is placed on an inner side of the brush holder inside the motor case and the bent section of the brush terminal is positioned on an outside of the brush holder outside the motor case.

5. A motor with brush according to claim 2, wherein the motor case includes a side plate covering an opening section of the motor case and an external connection member placed outside the side plate, wherein the brush terminal connects to the external connection member inside the outer circumference of the motor.

6. A motor with brush according to claim 1, wherein the external connection member is one of an external connection terminal and an external connection lead wire that protrudes from the outer circumferential surface of the motor.

7. A motor with brush according to claim 1, wherein the bent section of the brush terminal connects to the external connection member.

8. A motor with brush according to claim 1, wherein the external connection member is an external connection terminal that protrudes from the outer circumference of the motor, and the external connection terminal includes a plane section formed inside the outer circumference of the motor in a direction generally orthogonal to the direction of the rotary shaft of the motor.

9. A motor with brush according to claim 8, wherein the bent section of the brush terminal is disposed to overlap the external connection terminal and soldered to the external connection terminal to prevent the external connection terminal from lifting.

10. A motor with brush according to claim 8, wherein the external connection terminal is a plate-like member mounted to a side plate of the motor in parallel with the side plate, and has an extended section that extends in a circumferential direction of the motor and connects to the brush terminal and a terminal section that extends in a radial direction of the motor and protrudes outside the motor.

11. A motor with brush according to claim 8, wherein the position of the brush terminal is restricted in an axial direction of the rotary shaft of the motor by the bent section and a press-fitting of the brush terminal.

12. A motor with brush comprising:
a rotor having a rotary shaft and a commutator retained at the rotary shaft:
two brush sections each having a plane surface in an axial direction of the rotor and in sliding contact with the commutator; and two brush terminals that are integral with the brush sections, respectively, each of the brush terminals including a brush connecting section formed in the axial direction of the rotary shaft and having a plane surface that connects to the plane surface of each of the corresponding brush sections, and a bent section that is bent in a direction generally orthogonal to the axial direction of the rotary shaft, wherein the bent sections restrict positions of the corresponding respective brush terminals and the brush sections, and the brush terminals connect to external connection members that are provided inside an outer circumference of the motor, wherein the brush terminals are respectively connected through the bent section to an end portion of the extended section of the external connection members at positions which extend in a circumferential direction of the motor, and respective second end portions of the extended sections are disposed to approximately converge.

13. A motor with brush according to claim 12, further comprising a brush holder mounted on a motor case, wherein the brush terminals in a pair are mounted on the brush holder.

14. A motor with brush according to claim 13, wherein the brush holder defines insertion apertures and a part of each of the brush terminals is press fitted in each of the insertion apertures of the brush holder to fixedly retain each of the brush terminals to the brush holder.

15. A motor with brush according to claim 13, wherein each of the brush terminals has a base section connected to the brush section, and wherein, when each of the brush terminals is passed through each of the insertion apertures of the brush holder, the base section of the brush terminal connecting to the brush section is placed on an inner side of the brush holder inside the motor case and the bent section of the brush terminal is positioned on an outside of the brush holder outside the motor case.

16. A motor with brush according to claim 13, wherein the motor case includes a side plate covering an opening section of the motor case and external connection members placed outside the side plate, wherein the brush terminals connects to the respective corresponding external connection members radially inside the outer circumference of the motor.

17. A motor with brush according to claim 16, wherein the external connection members are external connection terminals having portions that protrude from the outer circumference of the motor, and the bent sections of the respective brush terminals are disposed to overlap the corresponding respective external connection terminals in the axial direction, and connected to the corresponding respective external connection terminals by soldering.

18. A motor with brush according to claim 17, wherein each of the external connection terminals is a plate-like member arranged to extend in a direction generally orthogonal to the axial direction of the rotary shaft, and has an extended section that extends in a circumferential direction of the motor inside the outer circumference of the motor and a terminal section that extends from the extended section in a radial direction of the motor and protrudes from the outer circumference of the motor.

19. A motor with brush according to claim 17, wherein the two external connection terminals that are to be connected to the two corresponding respective terminals have the respective extended sections arranged adjacent to each other, such that the two terminal sections are disposed adjacent to each other.

* * * * *